UNITED STATES PATENT OFFICE.

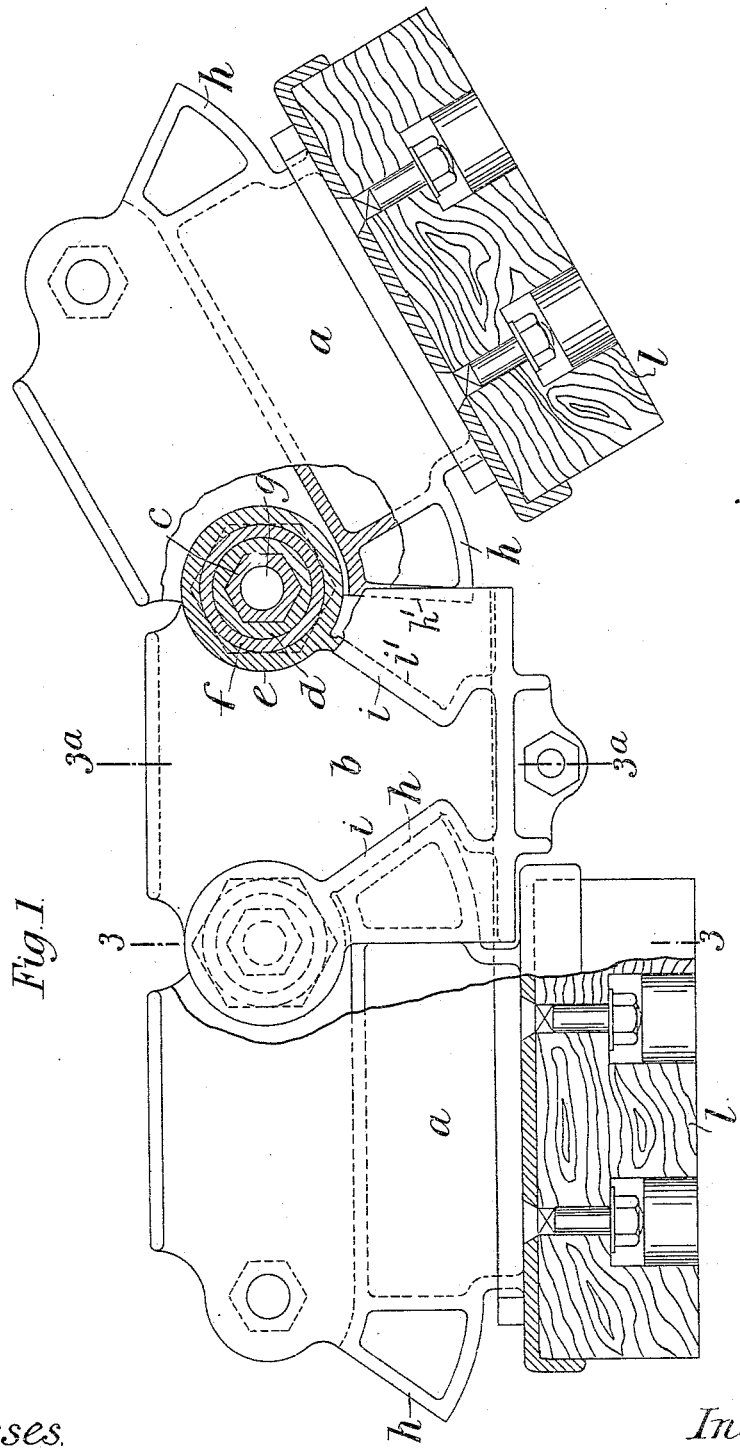

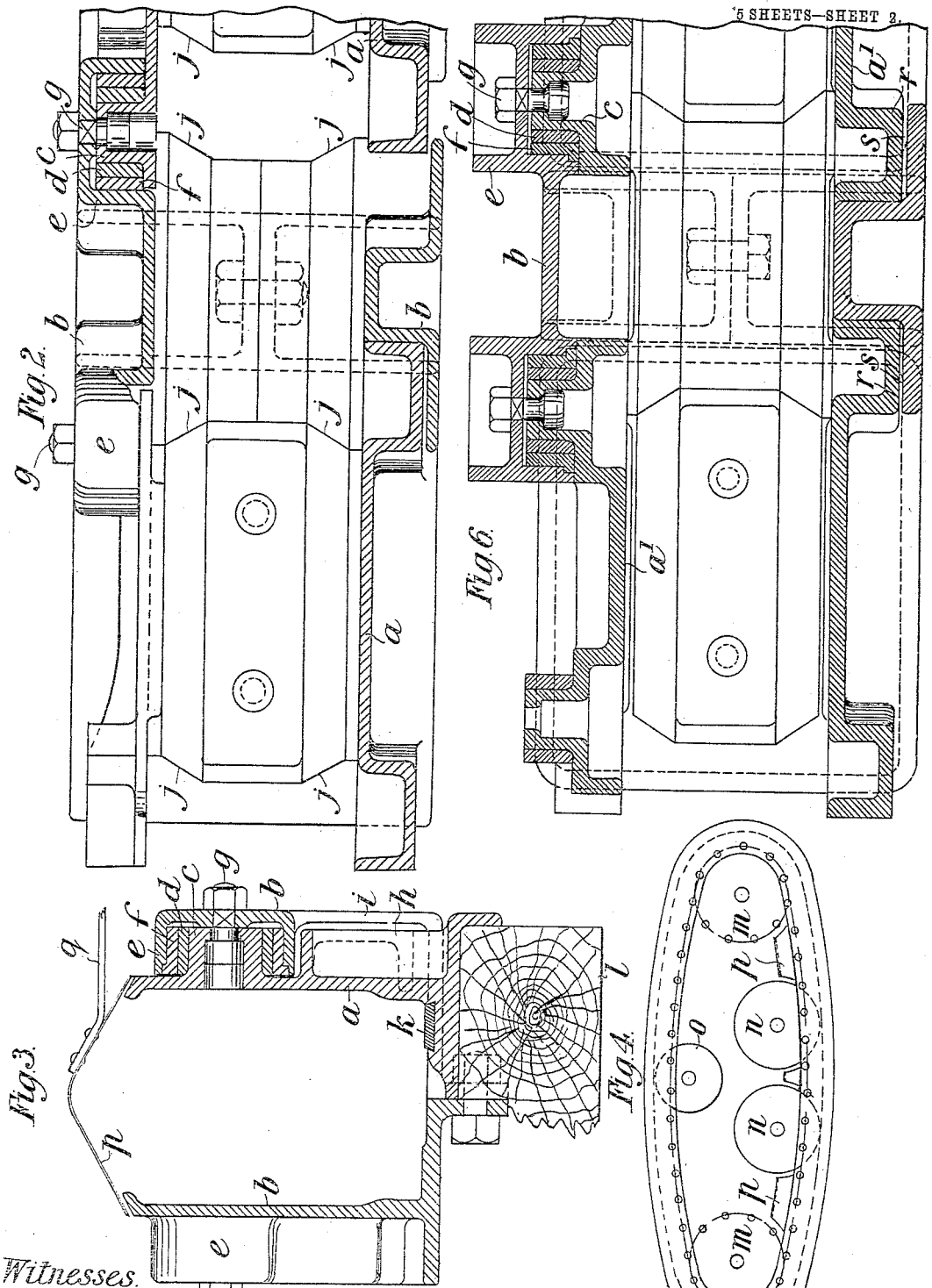

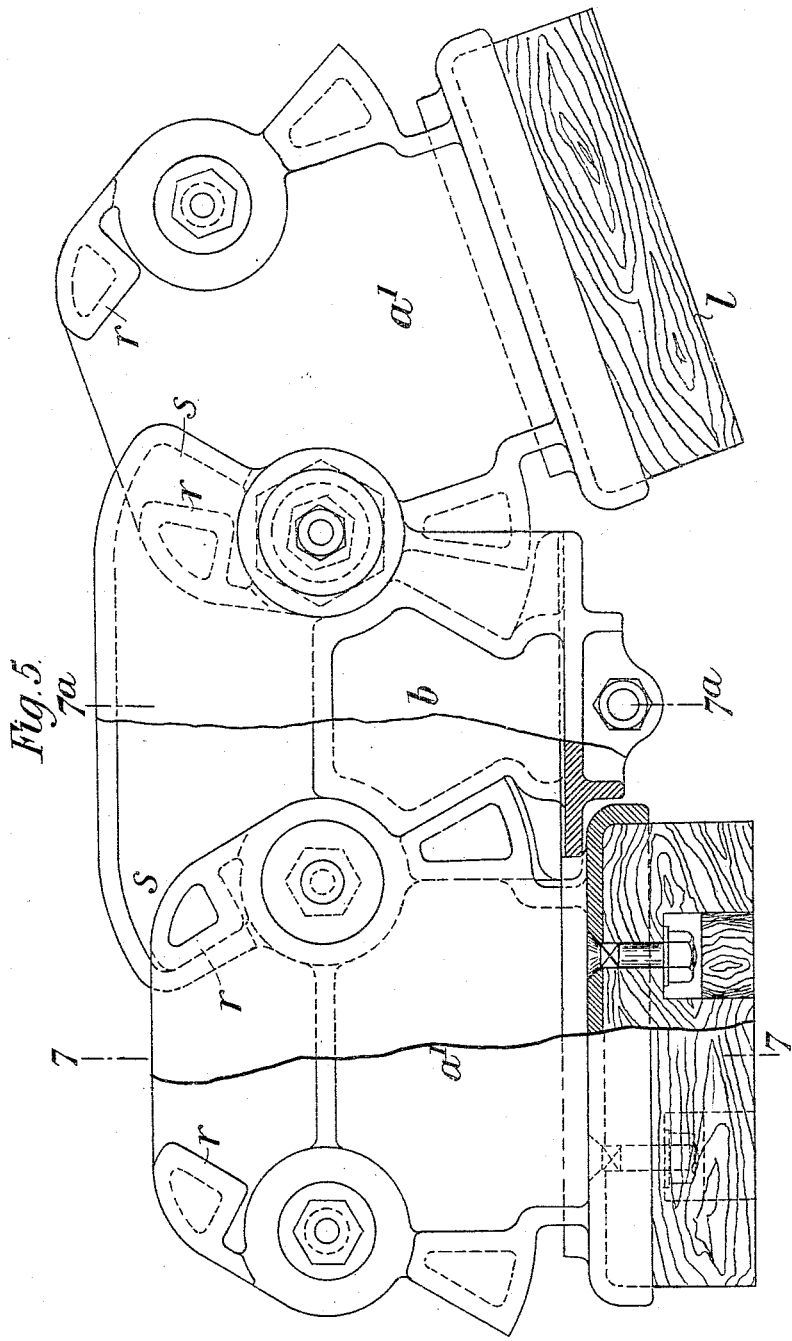

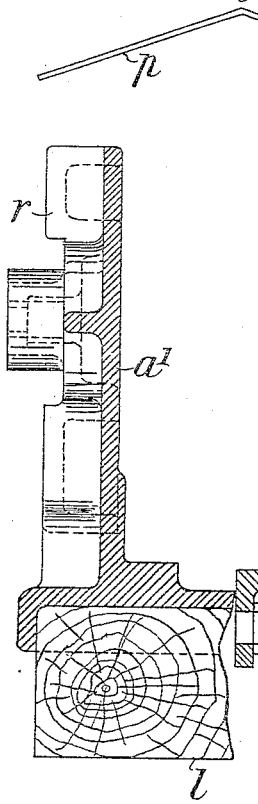
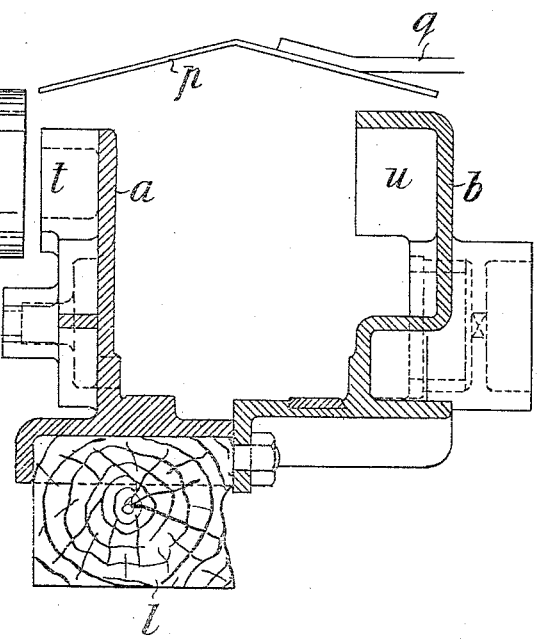
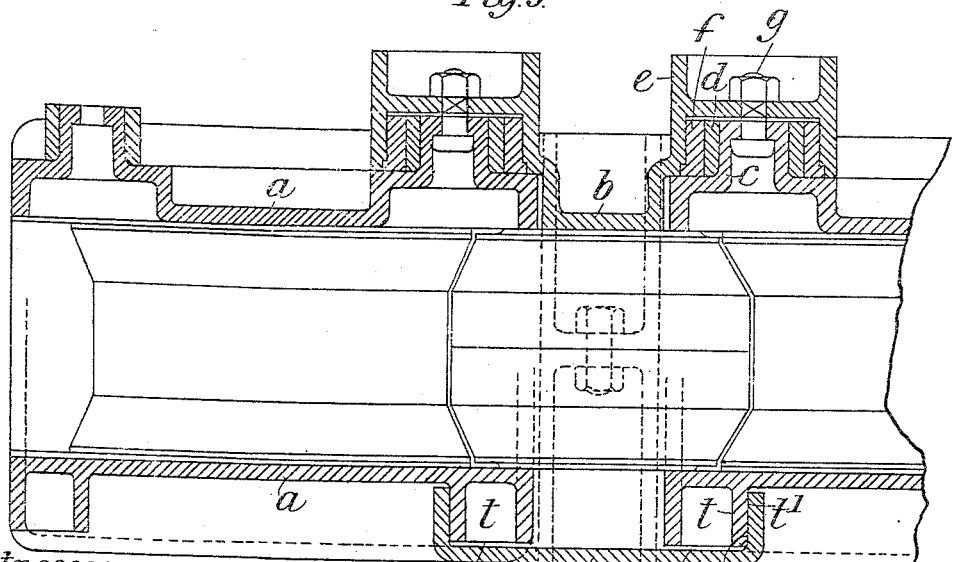

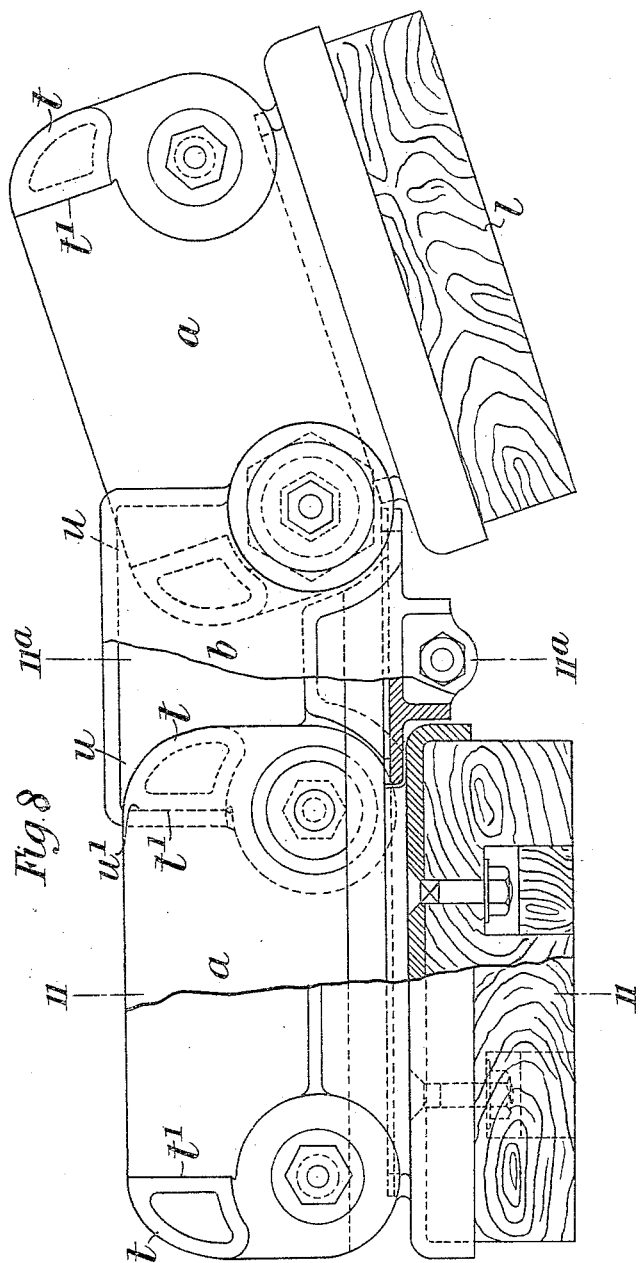

DAVID ROBERTS AND CHARLES JAMES, OF GRANTHAM, ENGLAND.

PORTABLE TRACK FOR MOTOR-VEHICLES.

No. 930,798. Specification of Letters Patent. Patented Aug. 10, 1909.

Application filed March 14, 1908. Serial No. 421,175.

*To all whom it may concern:*

Be it known that we, DAVID ROBERTS and CHARLES JAMES, both subjects of the King of Great Britain, and residing at Spittlegate Iron Works, Grantham, Lincolnshire, England, have invented new and useful Improvements in Portable Tracks for Motor-Vehicles, of which the following is a specification.

Our invention relates to traction engines, road locomotives and the like of the kind described in the specifications of former British patents Nos. 16,345 of 1904 and 3448 of 1906, and has mainly for its object to improve the construction of the chain track of such vehicles for the purpose of overcoming certain defects which are found in such tracks as hitherto made. The chief defect which it is the object of the present invention to overcome consists in a tendency or liability of the said track, when the vehicle is turning or traveling across sidewise upon a hill or incline, to cant over or twist and buckle laterally thereby causing the supporting rollers or wheels to run off the tracks, this being due largely to the fact that the track or path proper upon which the rollers or wheels supporting the vehicle roll is on the upper inside face of the track, that is to say, at a relatively considerable distance above the outer face of the track which runs upon the ground, the result being that the leverage which is exerted tends to cause excessive wear of the hinges and hinge pins of the track when the vehicle is being propelled upon a surface which is not level. Furthermore, it has been found that when vehicles of this type are driven over soft or sandy ground the sand or other soft material has a tendency to overflow into the inside of the chain and moreover the track as it passes over such ground picks up a quantity of the sand or like soil which, when it has reached the upper portion of the track, falls back into the inside of the lower part of the track.

Now, according to the present invention we construct a track consisting of a chain comprising alternate inside and outside links which are trough or U-shaped in cross-section and are preferably hinged to one another at or near the upper face of the chain by means of hinges which may be of a type resembling a door hinge but divided and arranged on the outsides of the links and preferably at a greater distance apart than hitherto. The tracks or paths on which the rollers supporting the vehicle run are provided at the bottom of the U or trough-shaped links and are therefore situated only a comparatively slight distance above the lower or outer face of the track which bears upon the ground. By this means it will be obvious that the leverage above referred to is reduced to a minimum whereby the tendency to canting, twisting or lateral buckling when the machine is turning or traveling laterally on an incline is obviated.

To enable the invention to be fully understood we will describe it by reference to the accompanying drawings, in which:—

Figure 1 is a sectional side view of a part of a chain track constructed according to the invention. Fig. 2 is a sectional plan view thereof. Fig. 3 is a transverse section partly on the lines 3—3, and $3^a$—$3^a$, Fig. 1, and Fig. 4 is a view drawn to a smaller scale illustrating a complete track. Fig. 5 is a view similar to Fig. 1 illustrating a modified construction of chain track. Fig. 6 is a sectional plan view thereof. Fig. 7 is a section partly on the lines 7—7 and $7^a$—$7^a$, Fig. 5, and Fig. 8 is a sectional side view of a part of a further modified construction of chain track. Fig. 9 is a sectional plan view thereof. Fig. 10 is a transverse section partly on the lines 11—11 and $11^a$—$11^a$, Fig. 9.

Referring first to the construction of track shown in Figs. 1 to 4 $a$, $a$ are the inside links and $b$ shows an outside link both these links being of trough or U shape in cross section as clearly shown. These links may advantageously be made of malleable iron or cast steel, the inside links $a$, $a$ being in one piece while each of the outside links is divided longitudinally into two parts as shown in Fig. 2. Each of the inside links $a$ has formed at the upper part of each side and at each end thereof a boss $c$ which may be of square, rectangular, hexagonal or other convenient shape in cross section and has fitted upon it a sleeve $d$ the outer surface of which is cylindrical. Each of the outside links $b$ is formed at each end and at each side thereof with a boss $e$ having a circular, square or other polygonal hole into which is fitted a bush $f$. This bush may either have a cylindrical body and polygonal flanges as shown or may be of polygonal shape throughout. To hinge the inside and outside links together the sleeves $d$ are passed into the bushes $f$ and are locked together by means of the bolts $g$. The upper portions of each link $b$, between and in line with these hinges form in effect the upper member of a girder. Each of the inside links is formed at its lower part with a pair of lugs $h, h$ at each end which lugs are adapted to pass into, and bear against, pockets $i, i$ formed at the lower part of each end of the outside links $b$. The bearing surfaces $i', h'$ of the links $b$ and $a$ respectively are preferably so located that the axis of the adjacent hinge connections will be substantially in the planes of said bearing surfaces. In other words said bearing surfaces are substantially radially disposed with respect to the axis of the adjacent hinge connection. The bottoms of the adjacent U-shaped links also bear against one another so as to form an unbroken track for the supporting wheels, and, in order that a smooth rolling surface shall be obtained, the adjacent ends of the links are made with diagonal surfaces as shown at $j, j$, Fig. 2. In the case of heavy vehicles the bottoms of the links $a$ and $b$ may have let into them renewable strips, as shown at $k, k$ which may be replaced when worn, Fig. 3, said strips forming bearing surfaces to be engaged by the wheels or rollers which support the vehicle. The inside links are fitted with the blocks $l$ of wood or other suitable material which are bolted thereto and form the tread surface of the track in the usual way. In some cases similar blocks may be secured to the outside links.

Fig. 4 shows diagrammatically a complete track, $m, m$ being the driving sprocket wheels one of which is arranged at each end of the track and which engage with the aforementioned bosses $e$ upon the outside links $b$; $n, n$ are the wheels or rollers which support the vehicle and roll on the bottoms of the U-shaped links $a$ and $b$ which form a sunk track as clearly shown.

$o$ is the usual jockey pulley for supporting the upper part of the pitched chain forming the track and may be adjustable; $p, p$ are shields which are supported from the frame of the vehicle from supports $q$ as shown in Fig. 3 and the object of which is to prevent dirt which drops from the upper part of the chain from passing into the sunk track.

Figs. 5 to 7 show a modified construction of track which differs from that above described, in that the hinges are located between the portions of the links $b$ which form the upper and the lower members of a girder, connecting the alternate tread carrying links, the hinges in this case serving merely to support the stress due to the propulsion of the vehicle. To effect this purpose the inside links $a', a'$ have their sides extended above the hinges which are constructed as in the previously described arrangement, the upwardly projecting portions being provided at each end with a lug $r$, the outside links $b$ having their sides also made higher and being provided with corresponding pockets $s, s$ at each end of each side and with which pockets the lugs $r, r$ engage. With this construction the upper member of the girder is formed by means of the contact faces of the said lugs and pockets $r$ and $s$ respectively, the lower member of the girder being formed as in the previous case by the contact faces of the lugs and pockets at the lower part of the chain. When the chain is bearing upon the ground the links interlock with a scissors-like action and the hinge pins are free from stress due to the weight of the vehicle.

Figs. 8 to 10 show a construction of track in which the inside and outside links $a$ and $b$ respectively are connected together by hinges which are the same as those above described, but which are placed near the lower edge or face of the chain so that the portions of the links $b$ between and in line with the hinge pins form the lower member of the girder. Each of the inside links $a$ is formed at the upper end of each side and at each end thereof with a lug $t$ having the bearing face $t'$, and each of the outside links is formed at the upper part of each side and at each end thereof with a recess or pocket $u$ of a shape corresponding to the lugs $t, t$, and having the bearing face $u'$ as in the construction last described. When the track is in use the projections $t, t$ upon the inside links engage with the recesses $u$ on the outside links, the faces $t'$ of the former bearing against the faces $u'$ of the latter thereby forming the upper member of the girder, the lower member of which, as above stated, is formed by the hinge pins connnecting the inside and outside links.

Having now particularly described and ascertained the nature of our said invention and in what manner the same is to be performed, we declare that what we claim is:—

1. A portable track for motor vehicles comprising a plurality of links U-shaped in cross section, and hinged together, certain of links being provided with tread portions and all of said links being provided with track portions within the same, said track portions being located between the plane of the tread portions, and the plane of the axes of said hinge connections.

2. A portable track for motor vehicles comprising a plurality of links U-shaped in cross section and hinged together, certain of said links being provided with tread portions, said links being provided with track portions within the same, and having plane bearing faces at each end, to engage abutting faces of adjacent links, the track portions of said links being located between the plane of the tread portions, and the plane of the axes of said hinge connections.

3. A portable track for motor vehicles comprising a plurality of links U-shaped in cross section, and hinged together, certain of said links being provided with tread portions, said links being provided adjacent to said hinge connections, with interlocking projections and recesses, provided with abutting bearing surfaces, said links being provided with track portions within the same, located between the plane of the tread portions, and the plane of the axes of said hinge connections.

4. A portable track for motor vehicles comprising a plurality of links U-shaped in cross section and hinged together, each of said links being provided with track portions in the bottom of said U-shaped portion, certain of said links being provided with exterior tread portions, said track portions being located between the plane of said tread portions and the plane of the axes of said hinge connections, alternate links being provided at opposite ends with recesses having bearing surfaces therein, the intermediate links being provided with projections to engage said recesses, said projections being provided with bearing surfaces to engage the bearing surfaces of said recesses.

5. A portable track for motor vehicles comprising a plurality of links U-shaped in cross section and hinged together, alternate links being provided with exterior tread portions, and all of said links being provided with interior tread portions located between the plane of said tread portions and the plane of the axes of said hinge connections, said links being provided adjacent to said hinge connections with abutting bearing faces, the axes of the hinge connections being substantially in the planes of the adjacent bearing surfaces.

6. A portable track for motor vehicles comprising a plurality of links hinged together, certain of said links being provided with exterior tread portions, alternate links being provided with recessed portions having interior bearing faces, the other links being provided with lugs having exterior bearing faces to engage the said interior bearing faces when adjacent links are in alinement with each other, the axes of the hinge connections being substantially in the planes of the adjacent bearing surfaces, and all of said links being provided with track portions between the plane of said tread portions and the plane of the axes of said hinge connections.

7. A portable track for motor vehicles comprising alternating inside and outside links, hinged together, the inside links being provided with tread portions, both inside and outside links being U-shaped in cross section and provided with track portions located in a plane between the axes of the hinge connections and said tread portions, said inside and outside links having the one recesses and the other projections to engage said recesses, the said recesses and projections being in a different plane from that of the axes of the hinge connections, substantially as described.

8. A portable track for motor vehicles, comprising alternate inside and outside links hinged together, certain of said links being provided with tread portions, the outside links being made in two parts divided from each other longitudinally of the track, all of said links being provided with track portions located between the plane of the axes of said hinge connections and the plane of the tread portions of the track, substantially as described.

9. A portable track for motor vehicles comprising alternate inside and outside links hinged together, certain of said links being provided with tread portions, the outside links being made in two parts, and both inside and outside links being U-shaped in cross section to form a sunk track located between the plane of the axes of said hinge connections and the plane of said tread portions of the track, the outside links being provided with bearing recesses at their ends and the inside links being provided with bearing lugs at their ends to engage said recesses, substantially as described.

10. A portable track for motor vehicles comprising alternating inside and outside links hinged together, all of said links being recessed or U-shape in cross section, and provided with track portions adjacent to the bottom of said recessed portions, the inside links having tread portions below said track portions, said inside and outside links being hinged together at points adjacent to the plane of said track portions, and provided adjacent to their upper portions, the one with recesses or pockets and the other with projections to engage said pockets, said track portions of said links being located between the plane of the axes of said hinge connections and the plane of said tread portions, substantially as described.

11. A portable track for motor vehicles, comprising inside and outside links, provided with interlocking hinge portions, said links being substantially U-shape in cross section and provided interiorly with track portions located below the plane of the axes of said hinge portions, said outside links being formed of two parts longitudinally divided, and rigidly connected, and having lateral pockets or recesses above the plane of the hinge connections, said inside links being provided with exterior tread portions, below said hinge connections and lateral projections above said hinge connections engaging the pockets of the inside links, substantially as described.

12. A portable or self-laid track for road locomotives and other vehicles comprising a series of alternate inside and outside links the latter being made in two longitudinal parts, and both the inside and outside links being made of U or trough-shape in cross section to form a sunk track and being hinged together near the lower part and provided with mutually engaging lugs or projections and recesses or pockets respectively at their upper parts, substantially as hereinbefore described.

DAVID ROBERTS.
CHARLES JAMES.

Witnesses:
 SAMUEL WILLIAM PAYNE,
 WALTER HAYNES.